(12) United States Patent
Bearman

(10) Patent No.: US 7,801,946 B2
(45) Date of Patent: Sep. 21, 2010

(54) SYSTEMS AND METHODS FOR ACCESSING WEB SERVICES VIA AN INSTANT MESSAGING CLIENT

(75) Inventor: Clive Bearman, Boston, MA (US)

(73) Assignee: Novell, Inc., Provo, UT (US)

( * ) Notice: Subject to any disclaimer, the term of this patent is extended or adjusted under 35 U.S.C. 154(b) by 1022 days.

(21) Appl. No.: 10/691,535

(22) Filed: Oct. 24, 2003

(65) Prior Publication Data

US 2004/0260820 A1    Dec. 23, 2004

Related U.S. Application Data

(60) Provisional application No. 60/461,816, filed on Apr. 11, 2003.

(51) Int. Cl.
*G06F 15/16* (2006.01)
(52) U.S. Cl. ........................ 709/203; 709/206
(58) Field of Classification Search ................ 709/203, 709/226, 230, 206
See application file for complete search history.

(56) References Cited

U.S. PATENT DOCUMENTS

| 7,216,043 | B2 * | 5/2007 | Ransom et al. | 702/62 |
| 7,376,959 | B2 * | 5/2008 | Warshavsky et al. | 719/330 |
| 2003/0105884 | A1 * | 6/2003 | Upton | 709/318 |
| 2004/0019645 | A1 * | 1/2004 | Goodman et al. | 709/206 |
| 2004/0078424 | A1 * | 4/2004 | Yairi et al. | 709/203 |

* cited by examiner

*Primary Examiner*—Philip C Lee
*Assistant Examiner*—Grant Ford
(74) *Attorney, Agent, or Firm*—Pillsbury Winthrop Shaw Pittman LLP

(57) ABSTRACT

Systems and methods for facilitating the exchange of data between users and modular services using a real-time communication client such as an instant messaging client. The services may be web services providing various services over a communication network. User commands may be generated in an instant messaging client, sent to an automated attendant, which generates a corresponding web service command, and forwards the web service command to the appropriate web service. The automated attendant may then forward to one or more users any messages that are generated by the web service.

43 Claims, 9 Drawing Sheets

700

SYSTEMS AND METHODS FOR ACCESSING WEB SERVICES VIA AN INSTANT MESSAGING CLIENT

CROSS REFERENCES TO RELATED APPLICATIONS

This application claims the benefit of U.S. Provisional Application No. 60/461,816, which was filed on Apr. 11, 2003, and which is hereby incorporated by reference.

BACKGROUND OF THE INVENTION

1. Field of the Invention

This invention relates to systems and methods for facilitating a user's access to web services and disparate enterprise systems where data and commands may be exchanged using an instant messaging client and an automated attendant.

2. Background of the Invention

The existence and popularity of instant messaging (IM) is known. IM allows users to "chat" with other users in real time. That is, it allows users to communicate with each other by permitting each user to view text messages from other users essentially instantaneously. The IM client software that is required for IM communication is becoming more pervasive and is now incorporated into operating systems, personal digital assistants, cell phones, and other systems.

Most IM communications are still between individuals for personal communication. Some companies have started using IM for some business communications. Although the prospect of using IM for business communications may be intriguing, businesses so far have found limited use for IM applications because various limitations exist with IM uses in business applications. For instance, under certain circumstances it may be desirable for an enterprise employee to have real-time access to an enterprise or a legacy system regardless of their physical location. These enterprise and legacy systems may provide various functionalities and services to am enterprise. Greater access to these systems by employees may provide significant benefit to the enterprise. Unfortunately, IM employee users are typically not able to access these enterprise and legacy systems through an IM client application for various reasons including, for example, the lack of appropriate security layers generally needed to prevent unauthorized access of the enterprise and legacy systems.

Some limited efforts have been made to produce development kits to create automated attendants for use with IM in order to fully appreciate the value of IM. However, these automated attendants tend to have limited capabilities. For instance, some currently available automated attendants used with IM may allow users to query for information from a particular information server or to locate a particular website. These systems, however, tend to have limited functionality and as a result, limited application.

SUMMARY OF THE INVENTION

The present invention includes systems and methods that facilitate a user's access to web services and disparate enterprise systems via an instant messaging (IM) client. Data and commands may be communicated between an IM client and web services via an automated attendant. The automated attendant, which may be an automated client BOT, may receive requests (referred to as user commands), may reformat the requests into web service readable requests (referred to as web service commands), and may forward the web service commands to the appropriate web service for execution. The automated attendant may further forward a response message from the web service back to the IM client and/or other IM clients. Thus, the invention facilitates the bidirectional exchange of information between users and web services in real time.

In order to facilitate real-time communication between users and web services, an automated attendant may be employed that includes a processor, a database, and a web services engine. The processor may receive and process user commands from IM users created in an instant messaging environment. The database may be used to store information relating to users, user command formats, Web Service Description Language files, web services, web service command formats, linking information between user commands and web services and web service command formats, and other information. Such data can be used to facilitate communication between users and web services.

According to an aspect of the invention, the user command may be a command created using an instant messaging (IM) client application. A user command created via an IM client application may be a request, a query, and/or command in a format that may be particular to a user or a group of users in an IM environment. The format of the user command may reflect the format of IM messages typically used by users of IM client applications. Such formats may make it more convenient for a user to quickly draft user commands when communicating with, for example, a web service.

According to another aspect of the invention, a web service command may be a command formatted according to the formatting requirements of a web service. In order for the web service to execute a command submitted by a user, the command that is received by the web service may be formatted in a manner that is understandable by the web service. The web service command may include a string of text and symbols that is readable by the web service.

According to another aspect of the invention, processing a user command by the processor may include linking the user command to a web service, a web service command format, a Web Service Description file, and/or other items. The processor may also parse user profile information in order to determine a user's privileges and roles.

According to another aspect of the invention, the database may store user profile information. The user profile information may include, for example, information relating to user's authorized commands, the user's user IDs and passwords for specific web services, preferred web services, user's personal information, privileges, and other user related information.

According to another aspect of the invention, the database may store directory information. The directory information may include, for example, corporate directory information such as a listing of enterprise users, user positions, roles, privileges and other information. Such information may be useful in controlling a user's access rights. For instance, directory information may provide a list of user names which may be used in order to grant access to and/or privileges of an enterprise system and to grant a user's privileges to the automated attendant's administrative commands such as privileges to create user commands.

According to another aspect of the invention, information that links a user command or a user command format to a specific web service and corresponding web service command format, may be stored in the database. Such information may include, for example, mapping information that maps a user command or a user command format to a Web Service Description Language file or its location, a web service[s] and/or a corresponding web service command.

According to another aspect of the invention, the web services engine may be used to locate Web Service Description Language files. The Web Service Description Language files may comprise of a list of web services, their location, web service descriptions, web service command formats, and other information relating to web services. The location of a Web Service Description Language file may be defined by a URL address.

According to another aspect of the invention, the web services engine may be used to communicate with web services. The web services engine may send web service commands to and receive response messages from the web services. The web services engine may also receive messages directed to one or more users from web services that were generated without prompting from any users such as alerts.

According to another aspect of the invention, the automated attendant may receive messages from web services and forward the messages to specific users. The messages may be forwarded as is or may be reformatted prior to forwarding the message to users. Prior to forwarding the messages, the automated attendant may determine which users have privileges to view the messages. The automated attendant may then send the original or reformatted messages to only those users having access privileges to the original or reformatted messages.

According to another aspect of the invention, the automated attendant may communicate with one or more users via an instant messaging (IM) network. An IM network may comprise of an IM server and one or more IM clients.

According to another aspect of the invention, the automated attendant may communicate with a web service via a communication link. The communication link may include, for example, the Internet, a intranet, a LAN, a WAN, a PSTN and/or other networks that may be used for transferring data.

According to another aspect of the invention, the web services that are accessed via the automated attendant may be any type of web services. By way of example, the services can be data processing services, data retrieval services, transactional services, and/or other types of services. These services can be services that may be offered in a network environment such as the Internet, an Intranet, an Extranet or other networks.

According to another aspect of the invention, the web services that are accessed may be associated with an enterprise system and/or a legacy system. A web service may be used in order to gain access to enterprise systems and/or legacy systems. This may allow enterprise users to have real time access to enterprise systems. These enterprise systems may include, for example, application servers, security applications, directories, ERPs, financial systems, accounting systems, system administration, planning and other enterprise systems.

According to another aspect of the invention, the automated attendant may interface with a remote database that includes a corporate directory. The corporate directory may provide a list of enterprise users and information relating to each enterprise user that may be helpful in determining a user's privileges such as the roles that are assigned to that user. The privileges associated with each user may be related to information access (e.g., web service generated messages), user commands (creation and ability to implement the user commands), and/or administrative privileges as they relate to the automated attendant, web services and/or enterprise systems. Such information may also be stored in the automated attendant's database.

According to another aspect of the invention, the automated attendant may be based on a non-provisional architecture. The non-provisional architecture may include a proxy user, a processor and a web services engine running off of a Java application server. The message processor may be used for processing user messages and/or web services messages and link user commands to Web Services Description Language (WSDL) files, web services and/or web service command formats. The web services engine may be used to communicate with web services and to access WSDL files.

According to another aspect of the invention, the automated attendant may be based on a provisional architecture. The provisional architecture may include a proxy user, a processor, a security and provisioning engine and a web services engine that may run on, for example, a Java application server. The processor may be used to process user and/or services messages and link user commands to web services and/or a web service commands. The security and provisioning engine may be used to control access to web services, user commands, administrative functionalities, enterprise systems and/or information that may be shared such as messages. The web services engine may be used to communicate with web services and to access WSDL files.

According to an aspect of the invention, methods of allowing users to access web services are provided. The methods may allow a user to request that a task be performed by a web service without requiring the user to find the proper web service location or requiring that the request be in a format understandable by the web service. These methods may include the operations of receiving a user command, linking the user command to a WSDL file, a web service and/or a web service command format, generating a web service command corresponding to the user command and sending the web service command to the web service.

According to another aspect of the invention, an operation for creating a user command may be performed via an IM client. The user command may be formatted differently from the format of a corresponding web service command. A user command may be in a form that is particular to a user or a group of users such as enterprise users. Further, the user command created using an IM client application may be formatted according to a user convenient format.

According to another aspect of the invention, a user command may be made functional by performing operations for linking a user command to a WSDL file. The operations may include an operation for defining user command parameters through an IM interface. Other operations may include, for example, identifying an appropriate WSDL file and its location (e.g., URL address), reviewing the WSDL file and finding the appropriate web service and corresponding web services command format that may be used in order to execute the user command, and linking the user command to the web services command format found in the WSDL file.

According to another aspect of the invention, an operation for storing information that links a user command or a user command format to a specific web service and corresponding web service command format may be performed. Such information may include, for example, mapping information that maps a user command or user command format to a specific web service and corresponding web service command or web service command format. The stored information may also include or alternatively include the identity and/or address of the relevant WSDL file.

According to another aspect of the invention, an operation for receiving messages from web services and forwarding the messages to one or more users may be performed. Once a user has successfully submitted a message (e.g., a web service command) to a web service, the web service may respond by sending a responsive message back to the original user and/or other users via the automated attendant. Alternatively, a message may be sent to the original user and/or other users via the automated attendant without any prompting from the web service. This may occur, for example, when the web service is generating an alert. The messages may be reformatted prior to forwarding the messages to a user via an IM network.

According to another aspect of the invention, user profile information, stored directory information, message content, databases and other data sources may be parsed to determine which users are to receive a message generated by a web service. This may occur, for example, when the web service is associated with an enterprise system and there is a need for restricting access to the message.

According to another aspect of the invention, a buddy or call name for the automated attendant may be created in an IM environment in order to create a proxy identity for the automated attendant. A buddy list for the automated attendant that lists users may be created in order to allow the listed users to access the automated attendant. Other operations may also be performed to facilitate the various functionality of the automated attendant in an IM environment.

According to another aspect of the invention, user profiles may be stored. The user profile may include various types of data including information relating to a user's authorized user commands, the user's user IDs and passwords for specific web services, preferred web services, user's personal information, privileges, and other user related information. The user command information may be use to find and/or identify, for each user command, the appropriate web service (and its address) associated with the user command and the corresponding web service command format.

According to another aspect of the invention, the automated attendant may be a bi-directional system. In addition to being able to return web service responses back to a user, the automated attendant may also allow web services to initiate contact with one or more user without prompting by a user. This may occur, for instance, when an alert is generated by a web service or when a web service for work approval process needs an approval from one or more users.

According to another aspect of the invention, a name may be assigned to the location of a WSDL file. The name may be associated with the address of the file, such as an URL address, thus eliminating the need for reproducing the address whenever the file needs to be located.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrating embodiments of the invention and together with the description serve to explain the principles of the invention.

DETAILED DESCRIPTION OF THE PREFERRED EMBODIMENTS

Figure 1A:
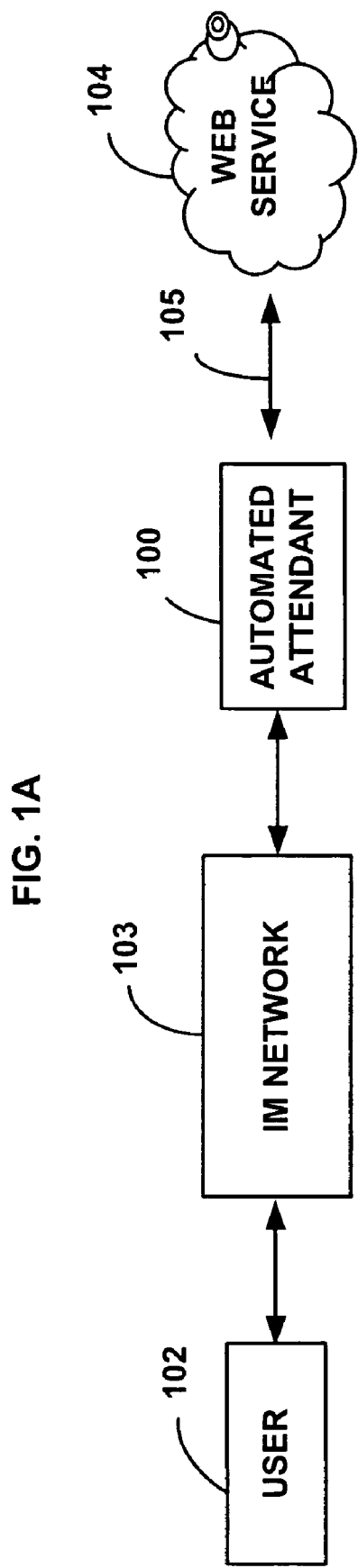
FIG. 1A is a block diagram depicting an automated attendant in communication with a user and a web service according to an embodiment of the invention.

According to the invention, systems and methods are proposed whereby an automated attendant facilitates the exchange of information and commands between one or more users and one or more web services via an instant messaging client. Further, by utilizing the automated attendant, users may request that a specific web service perform a specified task using a user's own command that may be created in a instant messaging (IM) environment. In some embodiments of the invention, security features may be included that allow the automated attendant to control access to the data being exchanged between users and services. In some embodiments, the automated attendant may operate within an enterprise network.

According to some aspects of the invention, instant messaging clients may be used in combination with automated attendants and web services to fully utilize the capabilities of instant messaging. In order to appreciate certain aspects of the invention, a description of web services follows.

A web service may be a service that may be a self-contained, self-describing, modular application that can be published, located, and invoked across communication links. In other words, a web service may be any type of services that is modular, locatable and accessible. A web service may perform various functions, which can be anything from simple requests (such as the request provided in the above baseball example) to complicated business processes. A sample web service might provide stock quotes or process credit card transactions or provide current temperatures of different cities. Web services may also operate as portals to enterprise and legacy systems that may allow IM users to directly access these systems.

Web services may further be defined as collections of network endpoints or ports. They may allow direct access to services provided by, for example, network applications and systems. Such functionalities may be provided by a standard network-programming interface through which the services can be directly accessed via a network. The function of web services may be better understood with the following example. Suppose an Internet user is interested in finding a specific statistic of a particular baseball player during a particular month. In order to do so, the user may go to a particular web page, such as a sports or news web page, go through a number of hyperlinked pages to reach the relevant page, and input the name of the player along with the month of interest into data fields of the relevant page to obtain the desired results. In such a situation, the user may be required to execute a number of steps before finally obtaining the desired results. Rather than going through these steps, a web service may allow the user to directly access the information using a single command string. The user simply submits a formatted request called a "web service command" to the appropriate web service and based on the web service command, the web service may retrieve and provide the desired information.

One standard on which web services are based on is Simple Object Access Protocol (SOAP). Simple Object Access Protocol establishes a common format that allows a system to call functions of another system across the Internet using XML. Layered on top of this protocol is the Web Services Description Language (WSDL). The relationship between SOAP and WSDL is that SOAP defines how to call a function on another computer while WSDL creates a method of describing what functions are available, their syntax, and semantics.

Web services are relatively new and the number of available web services increases each day. Generally, people do not directly access web services using their web browser. Instead, web services are typically accessed by other web applications. For example, these web services may be accessed by web application in order to retrieve specific data. The data retrieved from a web service may then be utilized by these web applications by directly incorporating the retrieved data into their interface or the retrieved data may be further processed.

FIG. 1A is a block diagram of a system that includes an automated attendant 100 facilitating the exchange of information between a user 102 and a web service 104 according to an embodiment of the invention. The user 102 may access the web service 104 using the automated attendant 100 via an instant messaging (IM) network 103 and a communication link 105. In order for the user 102 to communicate with the web service 104, the user 102 may generate a message using an IM client application (not shown). Each message that is generated may include one or more user commands. The format of a user command created in an IM environment (e.g., commands created using IM client applications and transmitted through an IM network) may be particular to a particular user or a group of users or to the user's enterprise. A user command may be a request that some sort of action be performed or may be a query to retrieve some sort of data. According to some embodiments of the invention, a user command may be formatted in a truncated manner that is often used for IM messages or in other user convenient formats. For example, for purposes of convenience, IM users may truncate a word such as "because" to "cuz" or a word such as "picture" to "pic". Similarly, commands may also be truncated. Thus, user commands may be formatted in any manner that may be acceptable to the IM client application. Once a message that includes a user command is generated, it may be sent to the automated attendant 100 via the IM network 103.

The IM network 103 may include an IM server and a plurality of IM clients. The IM server directs messages sent by users to appropriate addressees. Each addressee/user may be identified by a unique call or buddy name. Further, the automated attendant 100 may be represented by a proxy user in the IM network 103. Thus the proxy user may also be identified by a unique call name such as "enterprise buddy."

The automated attendant 100 may receive the message sent by the user 102 through an IM client that interfaces with the IM network 103. Once the automated attendant 100 receives the message, the automated attendant 100 may process the message to determine if the message includes a user command. If there is a user command, then the automated attendant 100 may generate a corresponding web service command. A web service command is a command that may be formatted in a specific manner such that the web service that eventually receives the web service command may be able to correctly interpret and execute the command.

A properly formatted web service command can be a long string of characters and symbols. Unfortunately, this may not be conducive to the types of messages usually written in an IM environment (such as user commands). As previously described, a user command created in an IM environment may be in a format that is most convenient for a user but may not be understandable by the targeted web service. The difference in the formats of a user command and a corresponding web service command may be illustrated by the following example. Suppose, for example, a user command (created via IM client) to sell 25 shares of stock xyz is written in a form that is most convenient for the user such as "sellxyz-25." The targeted web service, which provides the stock selling service, may not understand such a command as formatted since the web service may require that the commands it accepts be in a format that may be difficult or inconvenient for the user to generate. As a result, a web service command that is properly formatted may be generated based on the original user command. Once the correctly formatted web service command is generated, it may be sent to the appropriate web service 104.

In some embodiments of the invention, the automated attendant 100 may provide other functionalities as well. The automated attendant 100 may be a bi-directional system allowing information to flow between the user 102 and the web service 104 in either direction and may allow the web service 104 to initiate contact with the user 102 without prompting from the user 102. For instance, if a web service 104 generates a message, such as an alert when the value of a stock reaches a certain level, the web service 104 may initiate contact with a user by generating a message and sending it to the user through the automated attendant 102.

In some embodiments, the automated attendant 100 may store various data including user profiles. A user profile may include various types of data including user security information such as a user's user IDs and passwords for accessing various web services. Other information that may be stored includes, for example, preferred web services, personal information, privileges, authorized commands, and other user associated information. Also, information relating to Web Services Description Language files, web services and their locations, and web service command information, may be stored with the automated attendant 100.

After generating the correctly formatted web service command, the automated attendant 100 may send the generated web service command to the appropriate web service 104 via communication link 105. The communication link 105 between the automated attendant 100 and the web service 104 may include any type of communication system and/or network such as an IM network, the Internet, an intranet, a LAN, a WAN, a public switched telephone network (PSTN) and/or other networks capable of transferring data. Further, the communication link 105 may even be the IM network 103.

Upon receiving a web service command, the web service 104 may determine the request or query that is being sought by the web service command and based on that determination, may take specific actions. Examples of actions that a web service may execute include, for example, manipulation of data, retrieval of data, performance of a task such as selling of stocks, creation and transmission of a response including the results of the executed command, creation of a message requesting more information from the user, and/or other actions. Any messages (e.g., a response or a message requesting more information) sent back to the user 102 may be via the same communication channel (i.e., communication link 105, automated attendant 100 and IM network 103) and/or through other communication channels. The web service 104 may send multiple messages via the automated attended 100 and IM network 103 to multiple users 102. For example, a user 102 may wish to share information provided by the web service 104 with other users. In such a situation, a message sent to the user 102 and generated by the web service 104 in response to the user's command may also be sent directly to other users. Alternatively, the web service 104 may send a single message to the automated attendant 100, and then upon receiving the message, the automated attendant 100 may send copies of the message to the other users. Further, any web service initiated messages (e.g., messages that were not prompted by a user command) may also be sent to multiple users via the automated attendant 100.

Networks of users 102, web services 104 and automated attendants 100 may be formed. As the number of users 102, web services 104 and automated attendants 100 increases in a given network, security issues may arise. This may be particularly true when the web service 104 accesses enterprise systems. Many of today's enterprise application providers are embedding web service capabilities into their applications. Thus, the growth of web services that may be available in the future appears to be assured. Some web services 104 may offer services that may not be accessible by the public at large. For example, a web service 104 may have restrictive access such as when the web service 104 accesses backend systems of an enterprise. In such circumstances, the accessing and manipulation of data associated with that web service 104 may require that users provide security information such as a user ID and password. Such security information may be stored in the automated attendant 100 or may be located in a remote database ready to be accessed whenever a user 102 wants to access the web service 104. The issue of restricting access to enterprise systems through web services may be more pertinent in scenarios whereby multiple users have access to the automated attendant 100.

Figure 1B:
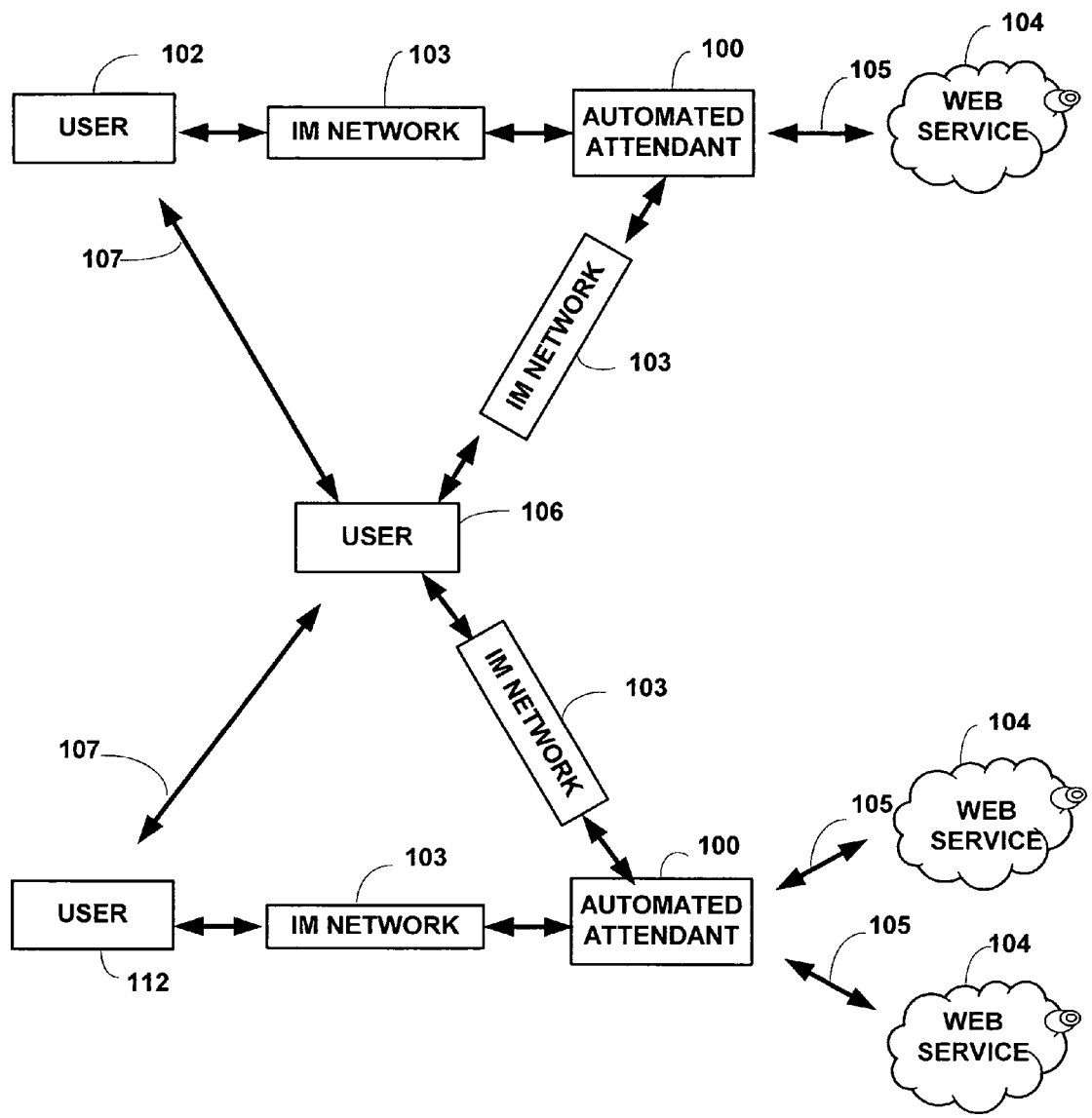
FIG. 1B is a block diagram depicting two automated attendants in communication with three users and three web services according to an embodiment of the invention.

FIG. 1B is a block diagram of automated attendants 100 facilitating the exchange of information between web services 104 and users 102, 106 and 112, according to an embodiment of the invention. In order for users 102, 106 and 112 and automated attendants 100 to selectively communicate with each other, each of the automated attendants 100 and users 102, 106 and 112 may list, in their IM client application's "buddy list," the call or buddy names of users and automated attendants with whom they wish to communicate. A buddy list may be an IM client list that lists those with whom the IM client user wishes to communicate. For two parties (e.g., user and/or automated attendant) to communicate with each other, an IM client application may require that each party list the call name of the other party in their buddy list with whom they wish to communicate. The use of buddy lists may be one way of channeling information to specific users, automated attendants and/or web services.

Channeling of and restricting access to information (e.g., messages from users and web services) to specific users and/or web services via an automated attendants may be accomplished using several approaches. Channeling of information may be just one of a plurality of steps in the process of securing the accessibility of user or web service generated information. The channeling of information may be accomplished through the IM client, the automated attendant 104 and/or the web service providing the information. For example, suppose a user 102 wishes to share a message sent by a web service 104 to the user 102 with user 106 but not with user 112. If an IM client is used for channeling the message, the user 102 may create a chat group that excludes user 112 or the user may use an IM client feature called "whisper" mode that prevents user 112 from viewing the information provided by the automated attendant 100. If the automated attendant 100 is used for channeling the message, it may use filters that may prevent those users without privileges from viewing the information. Such user privilege information may be stored with the automated attendant 100 or may be located remotely and accessed by the automated attendant 100. Similarly, web services may have access to information relating to roles and privileges of each user and may be able to determine which users should have access to which messages. In such a situation, the web service 104 may direct the message directly to specific users (e.g., users 102 and 106).

Figure 1C:
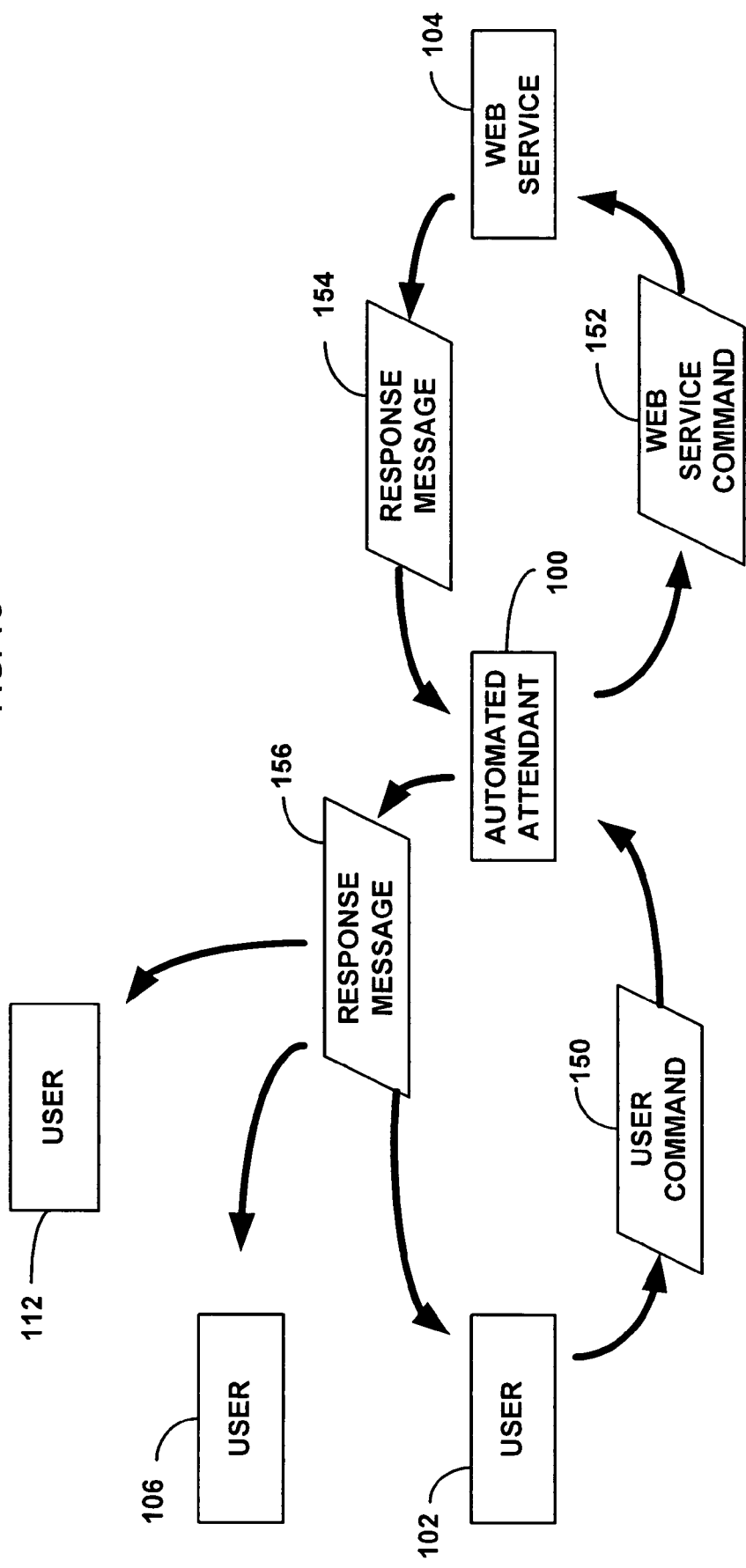
FIG. 1C is a block diagram depicting the relationship between users, a user command, an automated attendant, a web service and response messages according to an embodiment of the invention.

FIG. 1C is a block diagram of an exemplary relationship between users 102, 106 and 112, a user command 150, an automated attendant 100, a web service command 152, a web service 104, and response messages 154 and 156 according to an embodiment of the invention. As previously described, a user 102 may generate a user command 150 using an IM client application. The user command 150 may be sent to the automated attendant 100, which may generate a corresponding web service command 152. The web service command 152 may then be sent to the appropriate web service 104 where the web service command 152 and/or other actions may be executed. As a result of the executed command or action, a response message 154 may be generated by the web service 104 that may include the results of the executed command and/or actions, a request for more information, and/or other information. The response message 154 may then be sent to one or more users 102, 106, and 112, via the automated attendant 100. The automated attendant 100 may receive the response message 154 and may forward the message to the users 102, 106 and 112 as is. Alternatively, instead of sending the response message as is, the automated attendant 100 may process the response message 154 first in order to generate a new or reformatted response message 156 before sending the new or reformatted message to the users 102, 106, and 112. The original response message 154 may be reformatted or completely changed so that it is, for example, in a more user compatible format.

According to some embodiments of the invention, the automated attendant 100 converts a user command 150 to a properly formatted web service command 152 and sends the web service command 152 to the appropriate web service 104. When the automated attendant 100 receives a message that includes a user command 150, it may determine which web service 104 to contact and how to format the corresponding web service command 152. In order for the automated attendant 100 to contact the correct web service 104 and to submit a properly formatted web service command to the correct web service 104, the automated attendant 100 may locate and use a Web Services Description Language (WSDL) file to obtain the relevant information. A WSDL file may include a list of web services, the descriptions and locations (e.g., URL address) of each of the web services listed under the WSDL file and the proper web service command formats associated with each of the listed web services. Once the correct WSDL file is located, a user command and/or its format may be mapped or linked to the proper web service 104 (and its location) and to the proper web service command format. This linking information may then be stored and retrieved whenever the same user command is submitted in the future. Alternatively, rather than using stored linking information, the automated attendant 100 may locate the relevant information (e.g., the WSDL file location, the appropriate web service to contact and/or the proper web service command format) each time it receives a user command 150.

Figure 2:
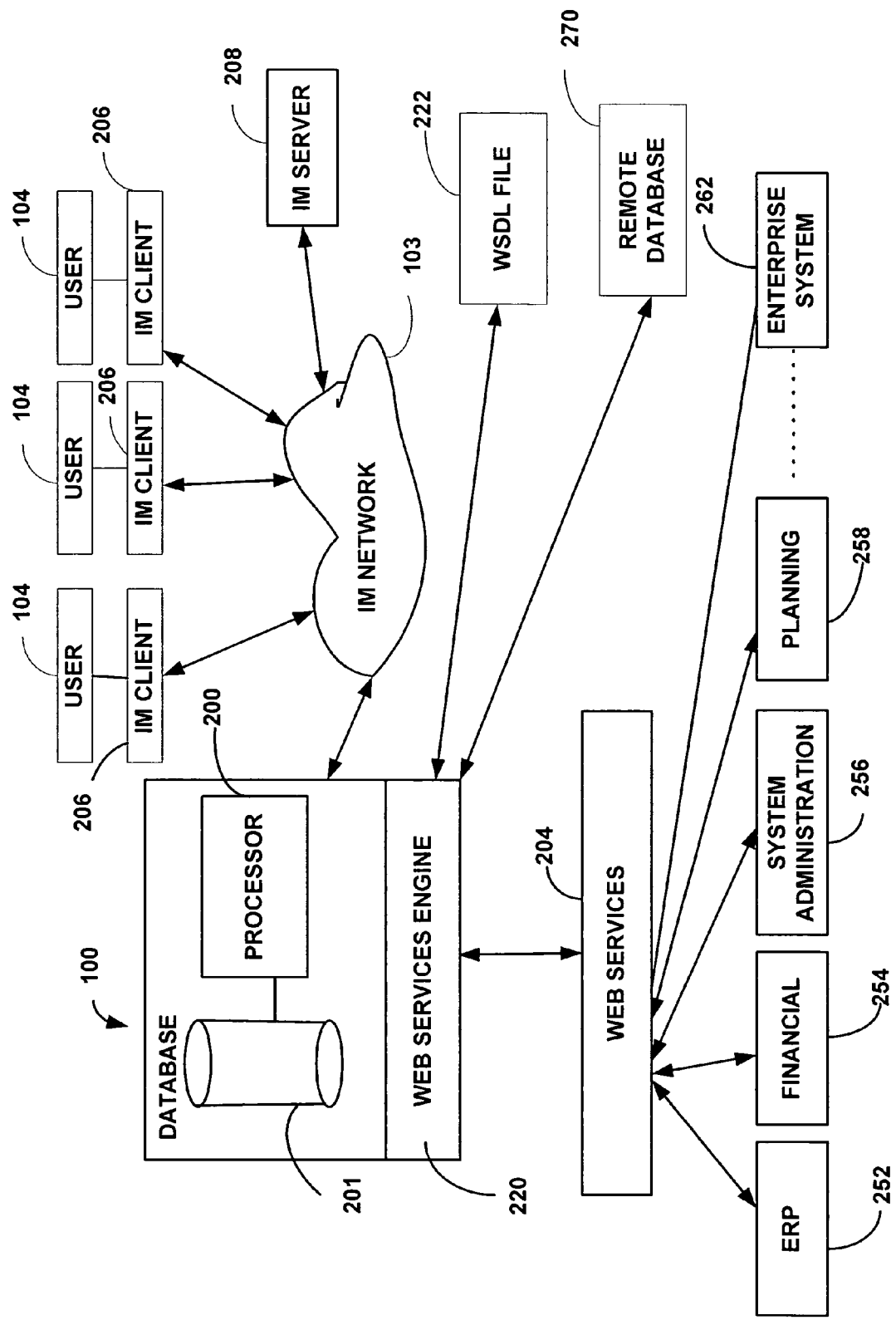
FIG. 2 is a block diagram depicting an automated attendant in communication with multiple web services and multiple users via an instant messaging network according to an embodiment of the invention.

FIG. 2 is a block diagram of an automated attendant 100 in communication with IM clients 206 and web services 204 according to some embodiment of the invention. The automated attendant 100 may include a processor 200, a database 201 and a web services engine 220. Users 102 may communicate with web services 204 via the automated attendant 100 using an IM client 206. Messages sent by users 102 through an IM client 206 may be directed to the automated attendant 100 via IM server 208, which may send the messages to the automated attendant 100 via IM network 103. The processor 200 may process messages from users and may determine whether the messages include user commands 150. If the messages do include user commands, then the processor 200 may generate corresponding web service commands 152 based on, for example, linking data stored in the database 201 and/or using a WSDL file 222 in order to locate the appropriate web services and the appropriate web service command formats. The database 201 may store information relating to, for example, users, security information, WSDL file information, web services information, web service command information, user command to web service command linking information and other information. The web services engine 220 may be used, for example, to communicate with web services 204 and remote databases 270 and for accessing WSDL files 222. A web service 104 may provide access to enterprise systems 252, 254, 256, 258 and 258 and/or legacy systems (not shown). The remote database 270 may include user security information for accessing the enterprise systems 252, 254, 256, 258 and 258, the automated attendant 100, the automated attendant's administrative functionalities, the user commands, and other items. The user security information may include, for example, user roles and privileges or other types of information that may determine a user's privileges. An example of a remote database 270 may include, for example, a directory for an enterprise. Other information included in the remote database 270 may include, for example, information relating to names of employees, employee titles and roles, employee security IDs and passwords, and other information. The data included in the database 270 may also be downloaded to the automated attendant database 201 or other databases that may be in communication with the automated attendant 100.

In order to access the enterprise systems 252, 254, 256, 258 and 258 through web services 204, certain steps may be followed. An enterprise may not want open access to their enterprise systems. That is, enterprises typically prefer that only authorized users, such as employees, have access their enterprise systems. Enterprises may further prefer that authorize users 102 have different levels of privileges that may be dictated by the user's position within the enterprise. Thus, if a user 102 wishes to access an enterprise system 252, 254, 256, 258 and 258 via the automated attendant 100, the user 102 may provide security accessing information (e.g., user ID and password) to the automated attendant 100. Such information may be stored locally by the automated attendant 100 or alternatively, may be provided each time the user 102 wishes to access one of the enterprise systems 252, 254, 256, 258 and 258. Such information may also be stored in a remote database 270, which the system 100 may access to obtain the needed user security information. The user security information may be provided by the enterprise itself or by a third party system administrator and may be information provided by a corporate directory. Once the enterprise system 252, 254, 256, 258 and 262 has been accessed through the automated attendant 100, various tasks may be performed such as file retrieval and sharing, transactions, system administration, work approval, collaborative communication, access to real-real time data and other tasks that may be performed using enterprise systems 252, 254, 256, 258 and 262.

The enterprise systems 252, 254, 256, 258 and 262 may be any system that provides enterprise functionality including, for example, an Enterprise Resource Planning (ERP) system 252, a financial system 254, a system administration 256, a planning system 258, and/or other enterprise systems 262. A web service 104 that is used to access an enterprise system 252, 254, 256, 258 and 262 may be part of the enterprise system 252, 254, 256, 258 and 262 or may be a separate modular system.

Figure 3:
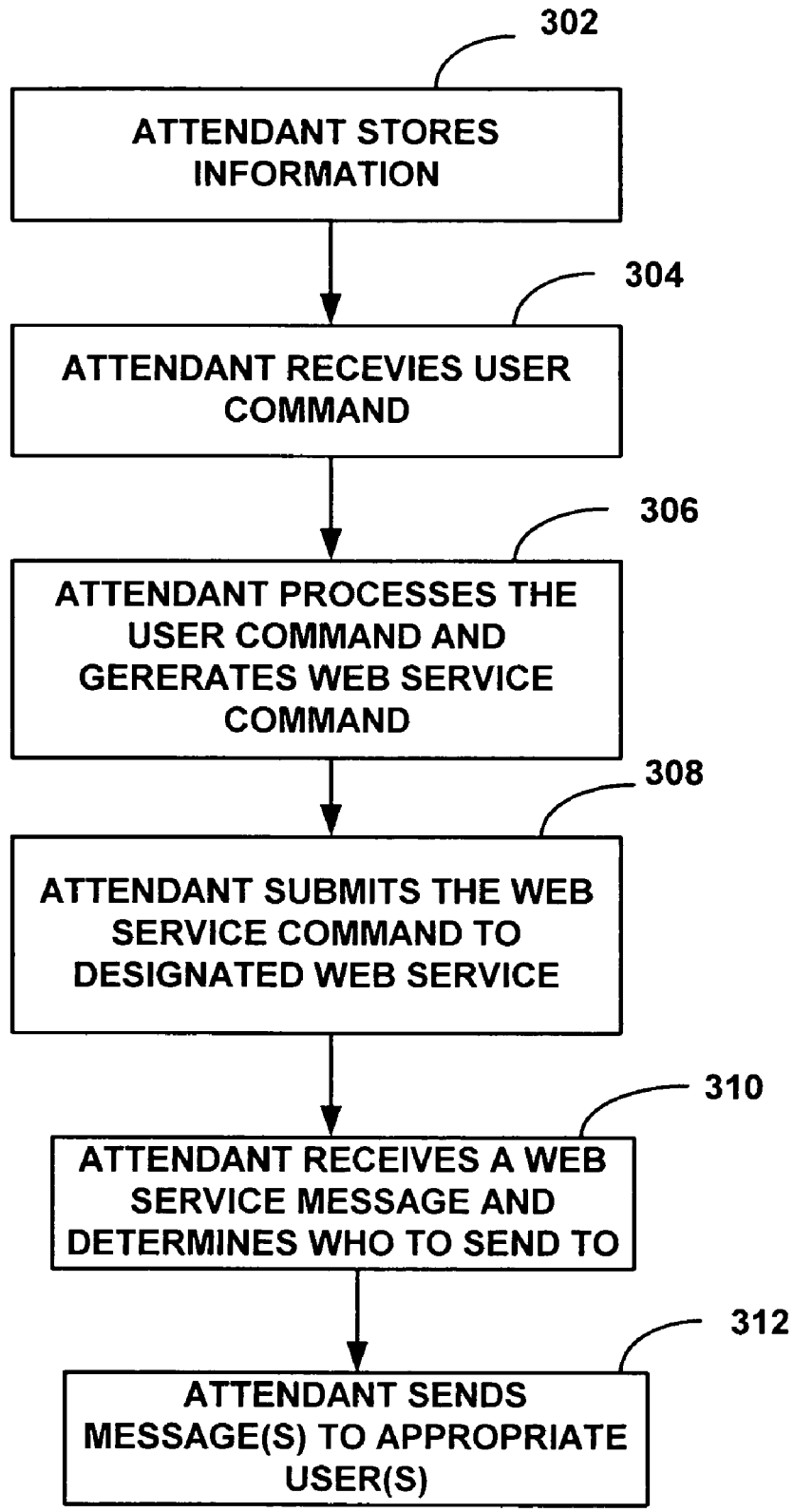
FIG. 3 is a flowchart for communicating with a web service via an automated attendant according to an embodiment of the invention.

FIG. 3 is a flowchart 300 for communicating with a web service using an automated attendant 100 according to some embodiments of the invention. The process 300 may begin when the automated attendant 100 stores various information including, for example, information that links user commands (or user command formats) to specific web service(s) and web service command format(s) at 302. Such linking information may include, for example, information relating to WSDL files, web services, web service commands, user commands, mapping information linking user commands to a web services and a web service command formats and/or other linking information. Other information that may be stored includes security information such as user profiles that may include user IDs and passwords for gaining access to web services and/or enterprise systems. After storing the linking and security information, the automated attendant 100 may receive a user command 150 created using, for example, an IM client at 304. After receiving the user command 150, the automated attendant 100 may process the user command 150 and generate a corresponding web service command 152 at 306. The automated attendant 100 may then generate a corresponding web service command 152 based on the stored information that links the received user command to a specific web service and a specific web service command format. Once the corresponding web service command 152 is generated, the automated attendant 100 may then submit the generated web service command 152 to the appropriate web service 104 based on stored information that links the user command to the appropriate web service at 308. Alternatively, rather than using stored information that links the user command 152 to a specific web service 104 and a specific web service command format, the automated attendant 100 may determine the appropriate web service 104 and the appropriate web service command format each time a user command 150 is received. For example, as long as the location of the WSDL file including the relevant information and the name of the appropriate web service is known, other relevant information may be determined (e.g., location of the web service and the appropriate web service command format).

Upon receiving a web service command 152, the appropriate web service 104 may execute the web service command 152, request more information from the user 102, send the results back to the user 102 and/or perform other actions. If the web service 104 requests more information from the user 102, then the web service 102 may send a response message 154 back to the user using the same communication channel or a different communication channel. If the response message 154 is being sent back to the user using the same communication channel, then the automated attendant 100 may initially receive the response message 154. After receiving the response message 154, the automated attendant 100 may then determine which users should receive the response message 154 at 310. That is, in addition to the user 102 who submitted the original user command 150, other users may have privileges to view the response message 154. The automated attendant 100 may then determine whether the response message 154 may be sent to the user as is or whether it must be reformatted (e.g., in order to make the response message more user readable). Thus, if required, the response message may be reformatted before being sent users. Once all of the users having permission to view the message are identified, the response message 154 or a reformatted version of the response message 156 may be sent to the appropriate users at 312.

Figure 4:
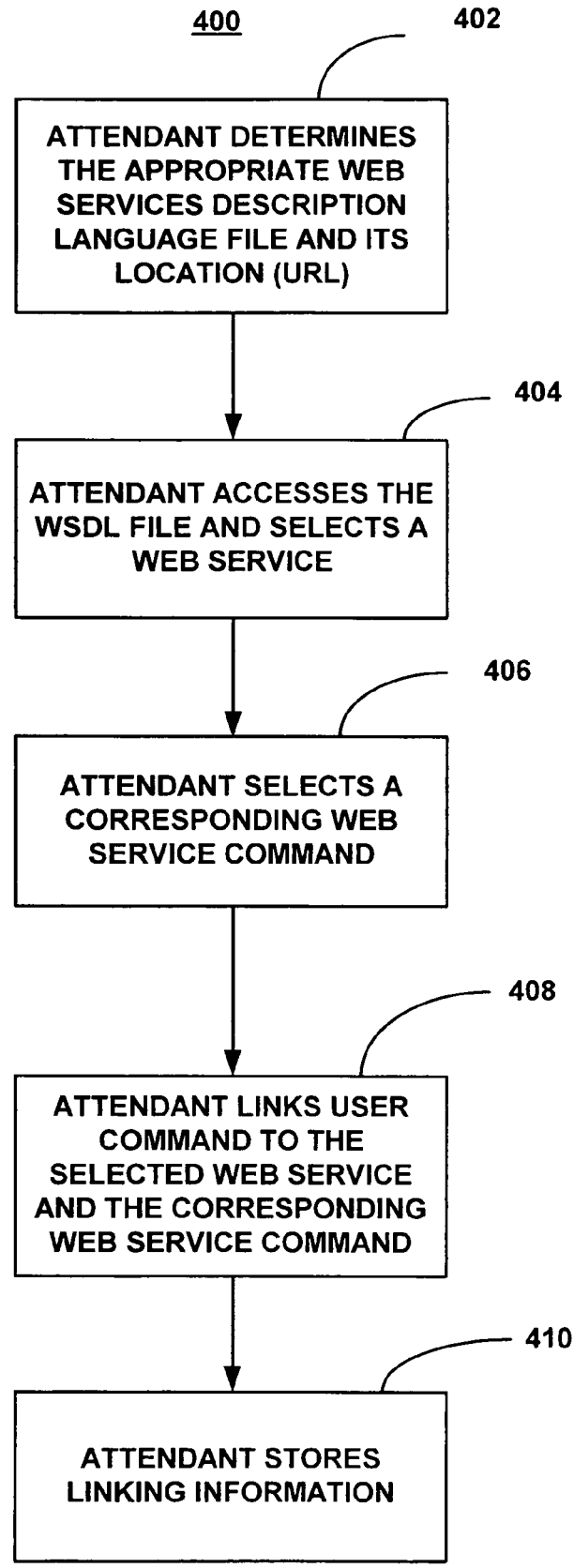
FIG. 4 is a flowchart for creating and linking a user command according to an embodiment of the invention.

FIG. 4 is a flowchart 400 for linking a user command 150 to a web service 104 and a web service command format according to an embodiment of the invention. The process 400 may begin when the automated attendant 100 determines the identity and/or location of the Web Services Description Language (WSDL) file that includes the relevant web service and web service command format information at 402. The user, the user's enterprise and/or some third party may provide such information, which may include the name or identify of the appropriate WSDL file and its address. The address of the WSDL file may be defined by, for example, a URL type address. This step may also involve the step of defining a configuration command (e.g., a name) for the WSDL file location. The configuration command may be used as a short cut for accessing web services information that may be included in a WSDL file. For example, suppose a web service 104 provides weather information. Suppose further that the web service 104 is listed under a particular WSDL file. A configuration command, "weather services," could be created which corresponds to the location of the WSDL file including the information relating to the web service providing the weather information. Thereafter, the configuration command may be used whenever the corresponding WSDL file needs to be accessed. Once the appropriate WSDL file has been identified and/or location determined, the automated attendant 100 may access the WSDL file and select the appropriate web service at 404. As previously described, each WSDL file may include a list web services, their descriptions and locations and associated web services command formats. Web services that are listed in the file may be reviewed and the appropriate web service to be employed may be selected. Each of the web services listed under the WSDL file may be associated with one or more web service command formats. The web service command formats may be specific to specific web services. For example, if a user 102 wishes to obtain the temperature of Boston, then a web service listed under the appropriate WSDL file may be selected. The selected web service may be associated with a web service command format that can be used to obtain the desired information such as "GET TEMP (java.lang,String<city>)". In order to get the web service 104 to execute the desired command, the web service command that is submitted to the web service may be formatted accordingly, e.g., "GET TEMP (java.lang,String<Boston>)". Thus after selecting a web service, a corresponding web service command format may be selected by the automated attendant 100 at 406. Note that the proper web service command format may require that additional information be inputted whenever such a command is to be submitted. For instance, in the above example, the user 102 may be required to insert the name of the city (e.g., Boston) into the web service command. Therefore, the user command that is initially submitted to the automated attendant 100 may also include the same information field as may be required in the web service command (e.g., the name of the city - Boston). To illustrate, suppose the user command that is submitted has the format "temp", then the actual required user command string may be "temp<city>" (in the example above, the proper user command would be "temp Boston"). Upon receiving the properly formatted user command, the automated attendant 100 may process the user command and generate the corresponding web service command (e.g., "GET TEMP (java.lang,String<Boston>)"). Although it may be possible to submit a user command 150 that is already a correctly formatted web service command 152, this approach may not be the preferred technique since web server commands 152 tend to be very long. Thus, in order to facilitate a user in drafting requests to a web service 104, a user convenient user command 150 may be created using an IM client.

Once the correct WSDL file, the correct web service and/or the correct web service command format have been identified, the automated attendant 100 may link the corresponding user command 150 to one or all of them at 408. Optionally, the automated attendant may then store the linking information at 410 for retrieval whenever the same user command 150 is submitted in the future.

Figure 5:
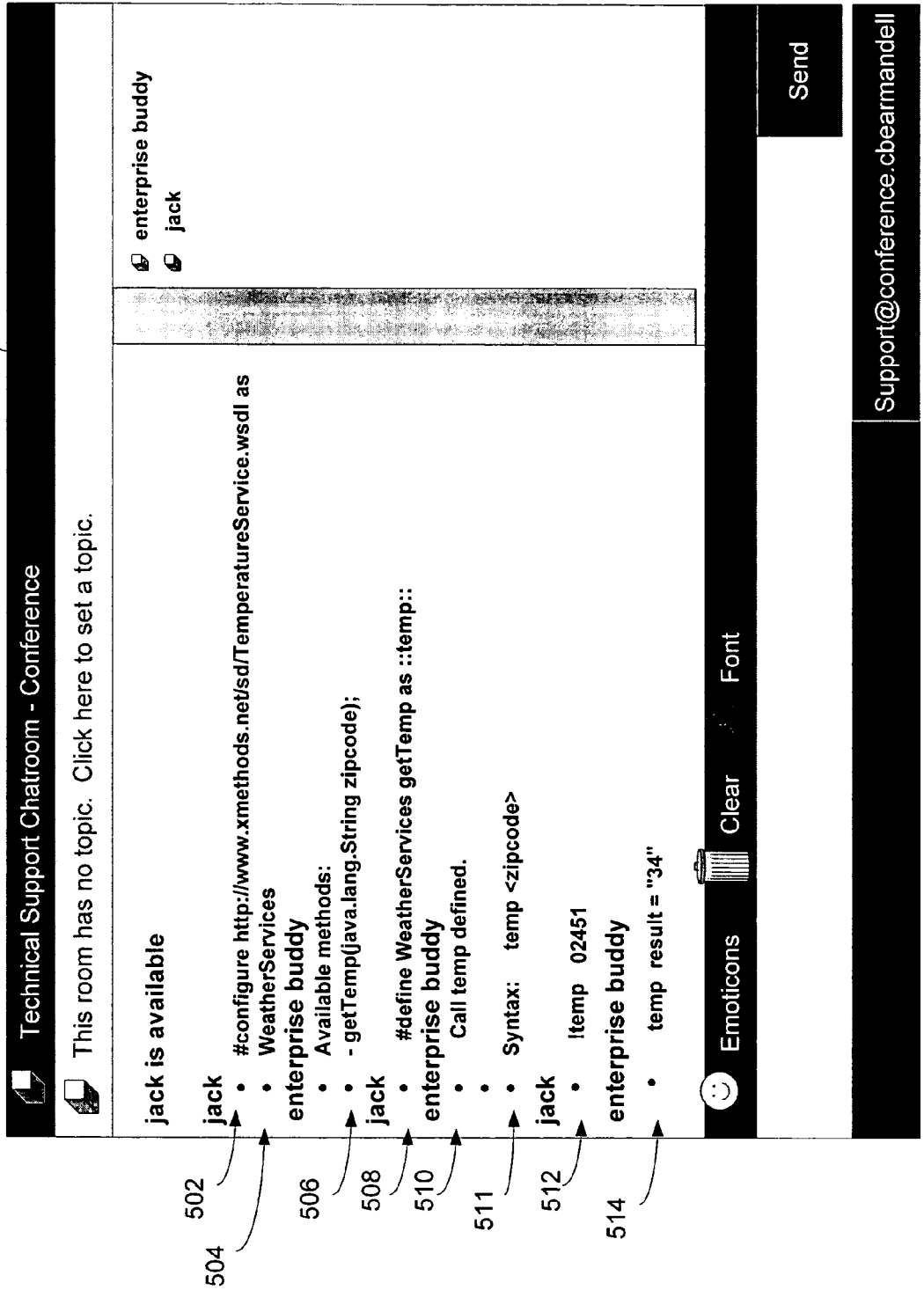
FIG. 5 is an exemplary instant messaging user interface depicting an exemplary dialogue between a user and an automated attendant when a user command is being created, linked and implemented according to an embodiment of the invention.

Using an IM interface, users can create user commands and link the user commands to WSDL files, web services and/or web service command formats. FIG. 5 is an exemplary IM interface 500 that depicts an exemplary dialogue between a user "Jack," and an automated attendant 100 that is assigned the buddy name "Enterprise Buddy." In this example, a user command is created and linked to a web service and a web service command format. The user, Jack, wishes to obtain the climate temperature for a particular zip code ("02451"). In order to do so, Jack may create a user command and link the user command to a WSDL file, a web service, and/or web service command format. In line 502, Jack identifies an address location for the WSDL file that may include the information of the web service that can provide the information that Jack seeks. In this example, the address he provides is http://www.xmethods.net/sd/TemperatureService.wsdl), which is assigned a name, "weather services" (i.e., configuration command) at line 504. The automated attendant 100 (e.g., Enterprise Buddy) may then go to that address to find the WSDL file and determine which web services (and their corresponding web service commands) are listed in the WSDL file. A list of corresponding web service command formats available for each of the web services listed in the WSDL file may then be provided at line 506 (the web service command formats are called "methods" in this example). In this case, only one web service command format is available, "get Temp(java.lang.String zipcode)". As described previously, web service command formats may be long strings of characters and/or symbols. Jack may now create a user command (in this example, the user command is "temp"), which may be used in the IM interface whenever he wishes to find the climate temperature of a particular zip code. In line 508, Jack links his user command (::temp:) to the corresponding web service command by identifying the correct WSDL file location name ("weather services") and the selected web service command ("get Temp"). Line 508 links the user command to the WSDL file location name and the selected web service command. This relationship is then stored ready to be used whenever the user command (temp) is invoked. Note that in this example, the user command is not directly linked to a web service command format. So long as the correct WSDL file location and the correct web service are known, other information (e.g., web service command format) may be obtained. Once the process of creating and linking a user command is completed, the automated attendant 100 may then respond by generating a confirmation as shown in line 510. In line 511, a syntax "temp<zipcode>" for the (temp)

user command may be created, which may be displayed on the IM interface ready to be invoked whenever the icon is selected. In this example, Jack may get the current temperature of a particular zip code by simply invoking the newly created command syntax and inputting the appropriate zip code into the IM interface 500 as shown in line 512. The results of the user command are than provided by automated attendant 100 as depicted in line 514. Note that the process for creating and linking the user command (format) may be performed well before the actual user command is submitted to the automated attendant 100. For example, in this case, the user command format can be created and linked well before the actual user command is submitted (!temp 02451). If the automated attendant 100 is used to access enterprise systems using web services, an enterprise administrator or other third parties may create all of the user commands so that each employee having access to one or more of the enterprise system may use the same formatted user commands. Alternatively, each user may be able to customize their user command formats.

Figure 6:
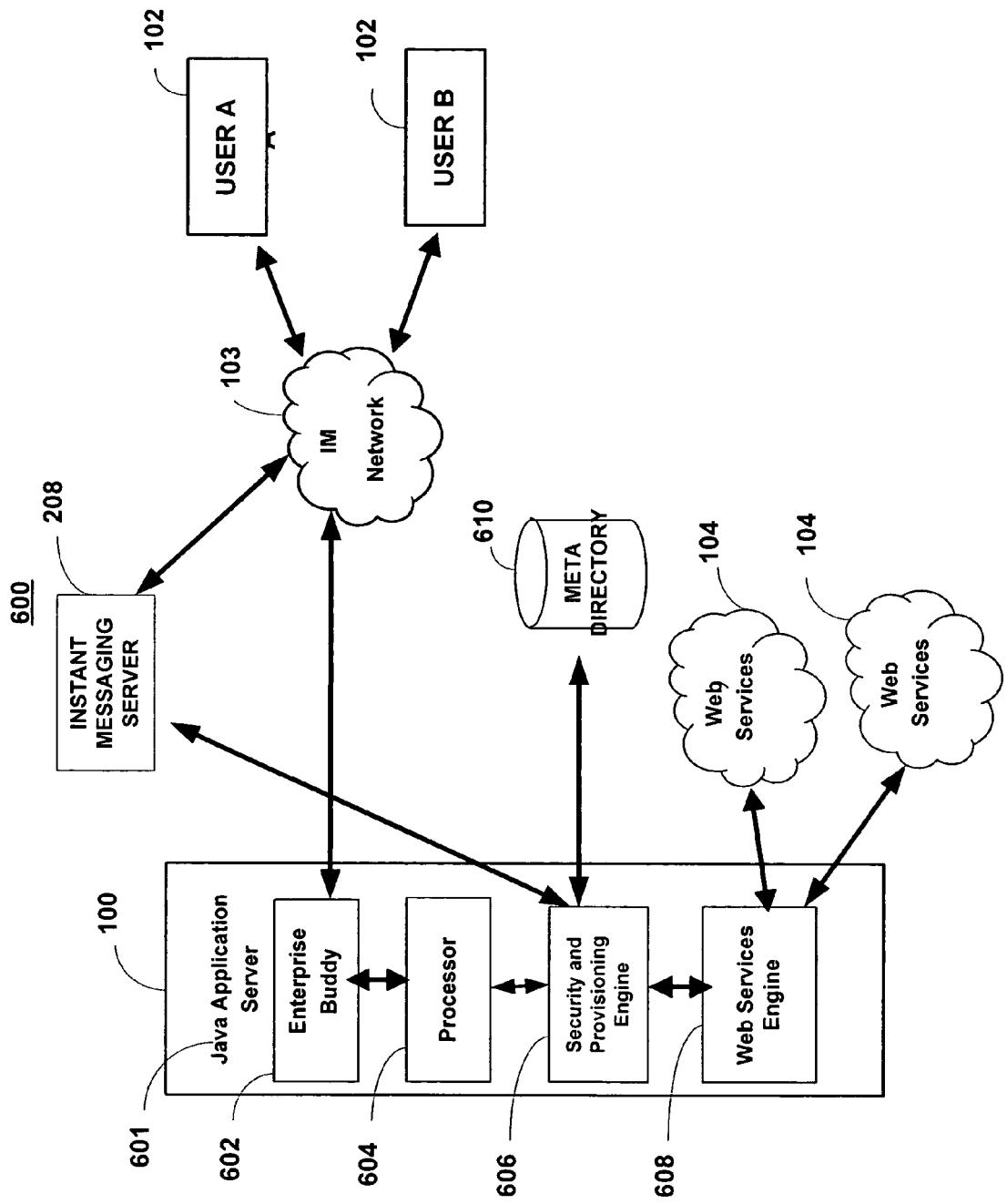
FIG. 6 is a block diagram depicting a provisioning architecture for an automated attendant according to an embodiment of the invention.

In order to implement some of the security measures that were previously discussed, a security and provisioning component may be utilized according to some embodiments of the invention. Referring to FIG. 6, which is a block diagram of an architecture 600 of an automated attendant 100 according to an embodiment of the invention. In this embodiment, the architecture 600 is a provisioning architecture that includes a security and provisioning engine 606. The automated attendant 100 may run on a Java application server 601 and may include a proxy IM user 602 (called, for example, "Enterprise Buddy"), a processor 604, a security and provisioning engine 606 and a web services engine 608.

The security and provisioning engine 606 may be in communication with a database that may include security information such as a meta directory 610 and may interface with the instant messaging server 208. By interfacing with the instant messaging server 208, the security and provisioning engine 606 may control user access to information (e.g., response messages) by using, for example, the channeling and whispering features of an IM client application and directing any information passed on by the automated attendant 100 to only users having privileges to access such information.

Information exchanged between users 102 and web services 104 may be through the proxy IM user 602 via the instant messaging server 208. The proxy IM user 602 may include an IM client that interfaces with the IM network 103. The processor 604 may review any incoming IM messages and may process the messages including determining whether a user command is included in the message. If a message does include a user command then that command may be further processed to determine the appropriate web service to contact and the appropriate web service command format to use when generating a corresponding web service command.

The security and provisioning engine 606 may provide a layer of security to the system 100 and to the web services 204 being accessed. In addition to directing information to specific users, the security and provisioning engine 606 may determine which users have access to the automated attendant 100 and which web services 204 may be accessed by the users 102. Further, the security and provisioning engine 606 may assign various roles and privileges to users that allow the users to access web services, their functions and to access various automated attendant functionalities. The security and provisioning engine 606 may parse security information such as those that may be found in a corporate directory or any database that may include security information relating to users. The web services engine 608 may allow the automated attendant 100 to find and communicate with web services 204 (along with its use for linking a user command to a WSDL file, a web service and/or a web service command format).

The meta directory 610 may store a user's privileges to access specific web services and the user's administrative privileges to access automated attendant's administrative functionalities. The combination of the security and provisioning engine 606 and the meta directory 610 may provide many other security features. For example, the combination of the security and provisioning engine 606 and the meta directory 610 may also enable the automated attendant 100 to control who has access to the automated attendant 100 itself. The automated attendant 100 may determine which users 102 have privileges to use which user commands 150. Through the security and provisioning engine 606, the automated attendant 100 may restrict certain users 102 from accessing certain user commands 150.

In other embodiments of the invention, the automated attendant 100 may have a non-provisioning architecture. The non-provisioning architecture may be the same as the architecture depicted in FIG. 6 except that there may be no security and provisioning engine 606. When the automated attendant 100 is non-provisioning, there are essentially no restrictions or security pertaining to which users may configure or execute web services. In other words, system users 102 may not be prevented from attempting to access any web services. Thus, unless the web services have their own security features, such as firewalls to prevent unauthorized users from accessing its services, these web services may be left exposed to security breaches. Also, in this architecture, there may be no restriction as to who may receive information that is returned from a web service call. Therefore, if user 102 and user 106 are chatting over the IM network and user 102 receives a response message 156 from a web service via the automated attendant 100 during user 102's chat with user 106, then user 106 may be able to view the response from the web service if user 102, user 106 and the web services 104 are in a group chat. Each user, however, may independently control access to messages (either outgoing or incoming messages) by using security features that may be included in the user's IM client. Such security features may be provided in currently available IM applications.

Figure 7:
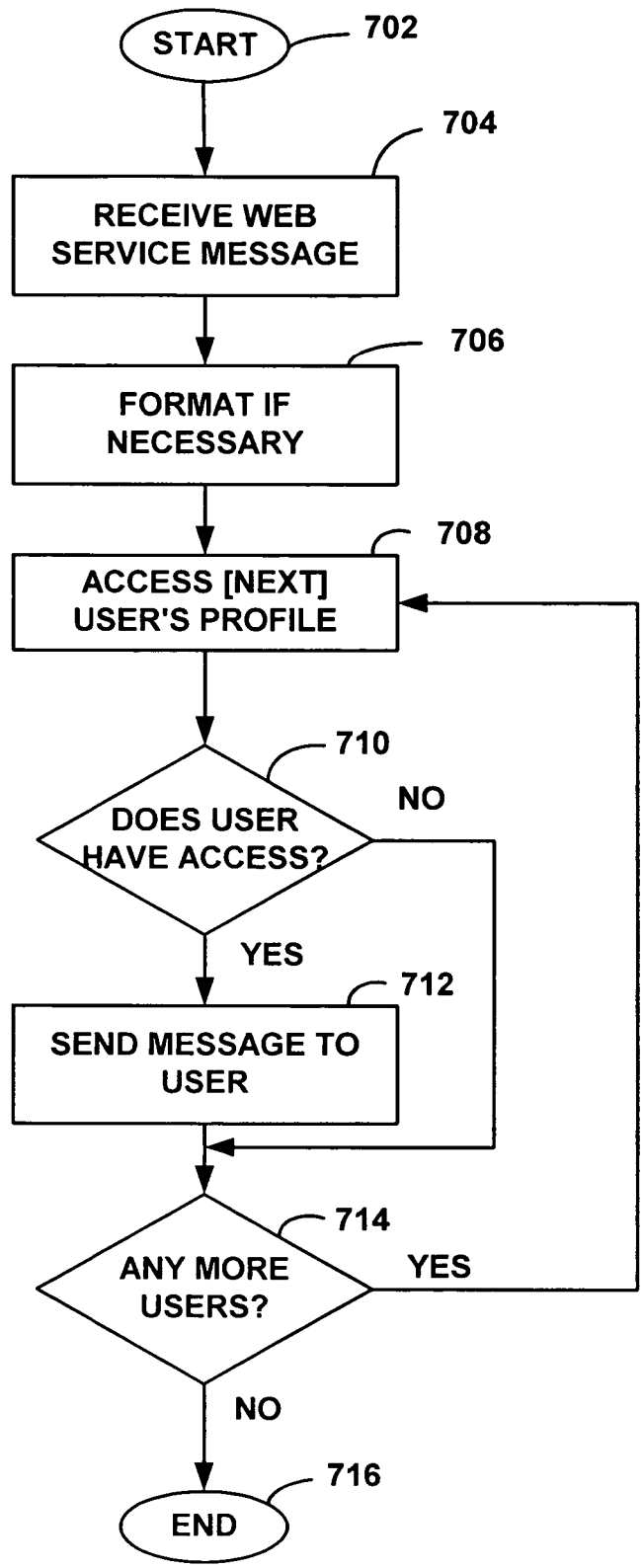
FIG. 7 is a flowchart for permitting one or more users to access a web service message according to an embodiment of the invention.

FIG. 7 is a flowchart 700 for permitting one or more users 102 to access messages from web services 104 according to some embodiments of the invention. Some web services 104 may be associated with specific enterprise and/or legacy systems. As mentioned previously, there may be a need for restricting access to these types of systems. Thus, it may be possible to provide certain security features to the automated attendant 100 particularly when the web services that are associated with enterprise or legacy systems do not have their own security measures in place. The process 700 may begin when an automated attendant 100 receives a message from a web service at 704. The message may include a data file along with a text/alphanumeric/coded message. The message may need to be reformatted so that users may view the message in a more readable format. Thus, if need be, the message may be reformatted at 706. A user's security profile may be accessed at 708. Such a security profile may be stored with the automated attendant 100 locally or may be located in a remote database. When a web service message is generated, it may be directed to specific users. In order to assure that those specified users have permission to view the message, security profiles for each of the users specified may be accessed. Alternatively, if no users are specified then the security profiles of all users having access to the automated attendant 100 may be accessed. Each user's security profile may define the user's roles and privileges, which may be part of a corporate directory stored in, for example, the remote database. A user's role (e.g., management level person or factory floor worker) may determine the user's access rights in addition to the specific privileges assigned to the user. Based on the user's profile, a determination may be made as to whether the user has access rights to the message at 710. If he/she does have access privileges then the message may be directed to the user at 712. Otherwise a determination may be made as to whether any more users should be allowed to access the message at 714. If there are more users to check then the process 700 may return to step 708 to access the next user's profile. Otherwise the process 700 ends at 716.

Several issues relating to security may arise when multiple users are in communication with an automated attendant 100 in an IM environment. Suppose for instance, an enterprise system, such as an enterprise system for payrolls, is accessible through a web service. Typically such web service may only be accessible by specific individuals. Suppose further that there are multiple individuals that are in a group chat with the automated attendant 100 and one user is sending a user command to the payroll system. In this example, it may not be appropriate for one or more of the other users to view the user command or any response message that is returned to the first user. Another issue that may arise when multiple users 102 are accessing enterprise systems by web services 204 using an automated attendant 100 is the issue of who will have administrative rights to the automated attendant 100. Enterprises may want to retain certain control over the various administrative privileges relating to the automated attendant 100. For example, it may be desirable that only certain users (such as system administrators) have the ability to create user command formats. Alternatively, there may be situations whereby each user may be granted privileges to create their own user command formats.

Each of these issues may be addressed by utilizing the security and provisioning engine 606 as described previously. Further, security measures may be enhanced by interfacing the automated attendant 100 with a directory that may be stored in a remote database 270. Such a directory may include information that may assure security such as those found in meta directories 610 and corporate directories. The automated attendant 100 may be in communication with a directory through multiple channels including, for example, web services 104. The directory in the remote database 270 may provide data relating to user roles and privileges that may determine what types of information and systems may be accessed by users and whether users may have administrative privileges (e.g., create user command formats).

By interfacing with a directory, multi-user chats may be possible with the automated attendant 100 without compromising security. This may be accomplished, for example, by retrieving user roles and privileges from the directory and using IM client protocol to control which users are allowed to view which information being exchange between users and web services. For instance, within the IM protocol there is a whispering protocol, which allows users to chat with the automated attendant 100 without other users being able to see the "whisper" message or the response to that message.

In some embodiments of the invention, the automated attendant 100 may operate essentially within an enterprise network. In such an environment, the users 102 are typically employees of the enterprise or are interested third parties who may have certain level of access to the internal network. Because the roles of each user and their privileges are substantially different, their ability to access specific web services may substantially differ. In order to accommodate the various needs of the various automated attendant users in such an environment, security measures such as those described previously may be implemented.

The automated attendant 100, according to some embodiments of the invention, is a dynamic system that may be used to meet various needs. For illustrative purposes, specific examples of how the automated attendant 100 may be implemented are described below.

In the first example, an automated attendant 100 may enable enterprise users to access information more efficiently. Enterprise users sometimes may face a confusing array of interfaces in order to discover specific information. In these situations, they can face many portals, web pages, file systems, and other impediments before they finally find the information they need. A web service enabled aggregated search could be provided via the automated attendant 100. The enterprise user can simply send a query command to the automated attendant 100 and wait for a list of URLs or locations to be returned. Such information, for example, may be stored within an enterprise network and may be accessed using the automated attendant 100. URLs may then be displayed in the IM client and may be easily activated using a web browser by clicking on the link that is displayed. Further, IM clients may allow for file transfer if needed. If the list included a file location, the transfer can be initiated via activation in the IM client.

In a second example, an automated attendant 100 may be employed when quick approval is needed to facilitate a more efficient workflow. For example, suppose a new document or web page is uploaded to an enterprise content management system and immediate approval for publishing is needed. Suppose further that there exists a web service that could send notifications to those designated approvers that are actively online, then the automated attendant 100 could direct the notification to the designated approvers via an IM network. The approvers could then issue an acceptance or denial of the change through the automated attendant 100.

In a third example, an automated attendant 100 may facilitate the administration and debugging of an enterprise network system. Suppose an enterprise exposed its network monitoring and systems administration via web services. Network administrators may then collaboratively administer, debug and monitor systems via IM commands. They would not have to be on a particular platform, in a particular location or on a particular machine. They would just need to use an IM client and the system administration's automated attendant.

In a fourth example, an automated attendant 100 may be used to facilitate collaboration within an enterprise. With the assistance of the automated attendant 100, several help desk operators and an employee may all communicate in a chat in order to resolve any problems of the employee. For example, suppose an employee has a question regarding his retirement benefits. The employee may chat with a help desk via instant messaging client and the automated attendant 100. In order to fulfill an employee query, the help desk operator may need to get the employee's social security number. The employee inputs the data into the IM chat window and the helpdesk operator uses it in a chat to the automated attendant. The automated attendant 100 may access a backend system for the enterprise via a web service in order to retrieve the necessary information and return the result to both parties for verification. After receiving the results, the employee may want to adjust the benefit. Again, the helpdesk operator may "talk" to the automated attendant 100 to adjust the benefits. Once the web service performs the requested adjustments, the results may be returned to both parties (operator and customer) for confirmation.

Although particular embodiments of the invention have been shown and described, it will be understood that it is not intended to limit the invention to the preferred embodiments and it will be obvious to those skilled in the art that various changes and modifications may be made without departing from the spirit and scope of the invention. In particular, although most of the embodiments disclosed above described the real-time communication link as being an IM network and that the services as being web services, other types of communication links and services may be used instead. Thus, the invention is intended to cover alternatives, modifications, and equivalents, which may be included within the spirit and scope of the invention as defined by the claims.

What is claimed is:

1. A system for accessing web services via an instant messaging client, comprising:
   a hardware processor configured to:
      receive a first instant message from an instant messaging client, wherein the first instant message includes a configuration command that identifies a Web Service Description Language (WSDL) file for a web service;
      receive a second instant message from the instant messaging client, wherein the second instant message includes a user command that names a web service command that invokes the web service identified in the configuration command;
      generate linking information that links the user command to the web service identified in the configuration command and the web service command named in the user command, wherein the processor stores the generated linking information in a database;
      receive, after the linking information is generated and stored in the database, a third instant message from the instant messaging client, wherein the third instant message includes the user command that names the web service command and one or more parameters for the user command; and
      generate a call to the web service command based on the linking information stored in the database, wherein the call to the web service command includes the one or more parameters for the user command in a predetermined format associated with the web service command; and
   a web services engine that invokes the web service identified in the configuration command with the generated call to the web service command, receives results from the web service in response to the web service processing the generated call to the web service command, and sends the results received from the web service to the instant messaging client.

2. The system according to claim 1, wherein the web services engine invokes the web service identified in the configuration command in response to locating one or more of the WSDL file or a network address that the configuration command further includes to identify the web service.

3. The system according to claim 1, wherein the generated call that the web services engine uses to invoke the web service has the predetermined format associated with the web service command.

4. The system according to claim 1, wherein the generated linking information that the processor stores in the database further links the user command to the predetermined format associated with the web service command.

5. The system according to claim 1, wherein the processor further stores one or more of an identifier or a password for a user of the instant messaging client in the database.

6. The system according to claim 1, wherein the processor further stores privileges for a user of the instant messaging client in the database.

7. The system according to claim 1, wherein the generated linking information that the processor stores in the database further links the user command to a location for the WSDL file that the configuration command further includes to identify the web service.

8. The system according to claim 1, wherein the generated linking information that the processor stores in the database further links the user command to a network address that the configuration command further includes to identify the web service.

9. The system according to claim 1, wherein the generated linking information that the processor stores in the database further links the user command to a name for the WSDL file that the configuration command further includes to identify the web service.

10. The system according to claim 1, wherein the web service is associated with one or more of an enterprise system or a legacy system.

11. The system according to claim 1, wherein the processor interfaces with a remote database that stores privileges for a user of the instant messaging client.

12. The system according to claim 1, wherein a user of the instant messaging client directly transmits the results received from the web service to at least one other user via the instant messaging client.

13. The system according to claim 1, wherein a user of the first instant messaging client selects one or more other recipients for the results received from the web service, and wherein the web services engine further sends the results received from the web service to the one or more other recipients.

14. The system according to claim 1, wherein the processor is further configured to return the web service command that invokes the web service and the predetermined format associated with the web service command to the instant messaging client in response to the first instant message.

15. The system according to claim 2, wherein the generated linking information that the processor stores in the database further links the user command to the WSDL file.

16. The system according to claim 6, further comprising a security and provisioning engine that controls access to the web service, the web service command, or the user command based on the privileges for the user of the instant messaging client.

17. The system according to claim 6, further comprising a filter that prevents the user of the instant message client from viewing the results received from the web service if the privileges for the user do not permit access to the results.

18. The system according to claim 6, wherein the processor is further configured to determine whether the privileges for the user of the instant messaging client permit access to the results received from the web service.

19. The system according to claim 11, wherein the remote database includes a directory that stores the privileges for the user of the instant messaging client.

20. The system according to claim 13, wherein the web services engine sends the results received from the web service to the one or more other recipients without prompting from the other recipients.

21. The system according to claim 14, wherein the processor is further configured to return a confirmation that the user command has been linked to the web service and the web service command in response to the instant messaging client in response to the second instant message, wherein the confirmation returned to the instant messaging client includes a syntax for subsequently invoking the user command.

22. The system according to claim 16, wherein the security and provisioning engine further controls access to the results received from the web service based on the privileges for the user of the instant messaging client.

23. The system according to claim 22, wherein the privileges for the user of the instant messaging client indicate whether the user has authorization to access one or more of an enterprise system or a legacy system associated with the web service.

24. A computer-implemented method for accessing web services via an instant messaging client, comprising:
receiving a first instant message from an instant messaging client, wherein the first instant message includes a configuration command that identifies a Web Service Description Language (WSDL) file for a web service;
receiving a second instant message from the instant messaging client, wherein the second instant message includes a user command that names a web service command that invokes the web service identified in the configuration command;
generating, via a hardware processor, linking information that links the user command to the web service identified in the configuration command and the web service command named in the user command, wherein the processor stores the generated linking information in a database;
receiving, via the processor, after the linking information is generated and stored in the database, a third instant message from the instant messaging client, wherein the third instant message includes the user command that names the web service command and one or more parameters for the user command;
generating, via the processor, a call to the web service command based on the linking information stored in the database, wherein the call to the web service command includes the one or more parameters for the user command in a predetermined format associated with the web service command;
invoking, via a web services engine, the web service identified in the configuration command with the generated call to the web service command, wherein the web services engine receives results from the web service in response to the web service processing the generated call to the web service command; and
sending the results received from the web service to the instant messaging client.

25. The method according to claim 24, wherein the web services engine invokes the web service identified in the configuration command in response to locating the WSDL file that the configuration command further includes to identify the web service.

26. The method according to claim 24, wherein the web services engine invokes the web service identified in the configuration command in response to locating a network address that the configuration command further includes to identify the web service.

27. The method according to claim 24, wherein the web services engine receives the results from the web service in a message sent from the web service to the web services engine.

28. The method according to claim 24, wherein the web service is associated with an enterprise system.

29. The method according to claim 24, wherein the web service is associated with a legacy system.

30. The method according to claim 24, wherein the processor further stores one or more of an identifier, a password, or privileges for a user of the instant messaging client in the database.

31. The method according to claim 24, further comprising parsing security information for a user of the instant messaging client to determine whether the user has authorization to access the web service.

32. The method according to claim 24, further comprising returning the web service command that invokes the web service and the predetermined format associated with the web service command to the instant messaging client in response to the first instant message.

33. The method according to claim 27, further comprising sending the results in the message received from the web service to one or more other recipients selected by a user of the instant messaging client.

34. The method according to claim 30, further comprising controlling, by a security and provisioning engine, access to one or more of the web service, the web service command, or the user command based on the identifier, the password, or the privileges for the user of the instant messaging client.

35. The method according to claim 31, wherein the processor further stores the security information for the user of the instant messaging client in the database.

36. The method according to claim 32, further comprising returning a confirmation that the user command has been linked to the web service and the web service command in response to the instant messaging client in response to the second instant message, wherein the confirmation returned to the instant messaging client includes a syntax for subsequently invoking the user command.

37. The method according to claim 35, wherein the database includes a directory that stores the security information for the user of the instant messaging client.

38. A non-transitory program storage device readable by a machine, tangibly embodying a program of instructions executable by a machine to perform a method for accessing web services via an instant messaging client, the method comprising:
receiving a first instant message from an instant messaging client, wherein the first instant message includes a configuration command that identifies a Web Service Description Language (WSDL) file;
returning a web service command that invokes a web service listed in the WSDL file to the instant messaging client in response to the first instant message;
receiving a second instant message from the instant messaging client, wherein the second instant message includes a user command that names the web service command that invokes the web service listed in the WSDL file;
generating linking information that links the user command to the web service listed in the WSDL file and the web service command named in the user command, wherein a processor stores the generated linking information in a database;
receiving, via the processor, after the linking information is generated and stored in the database, a third instant message from the instant messaging client, wherein the third instant message includes the user command that names the web service command and one or more parameters for the user command;
generating, via the processor, a call to the web service command based on the linking information, wherein the call to the web service command includes the one or more parameters for the user command in a predetermined format associated with the web service command;

invoking, via a web services engine, the web service listed in the WSDL file with the generated call to the web service command, wherein the web services engine receives results from the web service in response to the web service processing the generated call to the web service command; and sending the results received from the web service to the instant messaging client.

39. The program storage device according to claim 38, wherein the web services engine receives the results from the web service in a message sent from the web service to the web services engine.

40. The program storage device according to claim 38, wherein the processor further stores privileges for a user of the instant messaging client in the database.

41. The program storage device according to claim 38, wherein further comprising controlling, by a security and provisioning engine, access to one or more of the web service, the web service command, or the user command based on the privileges for the user of the instant messaging client.

42. The program storage device according to claim 38, further comprising:

returning the predetermined format associated with the web service command to the instant messaging client in response to the first instant message; and returning a confirmation that the user command has been linked to the web service and the web service command in response to the instant messaging client in response to the second instant message, wherein the confirmation returned to the instant messaging client includes a syntax for subsequently invoking the user command.

43. The program storage device according to claim 39, further comprising sending wherein the results in the message received from the web service to one or more other recipients selected by a user of the instant messaging client.

* * * * *